A. D. SOHMER.
ICE BOX.
APPLICATION FILED DEC. 2, 1921.
1,436,324.
Patented Nov. 21, 1922.
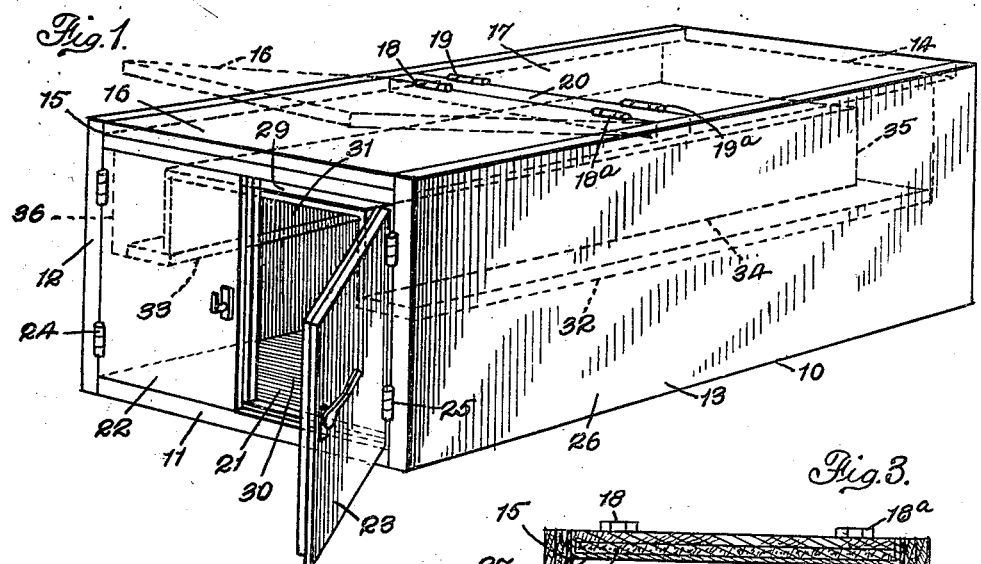
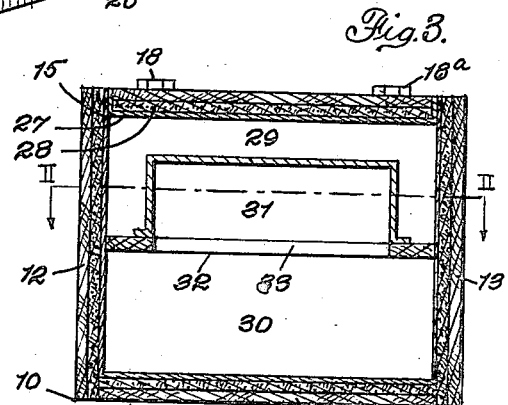
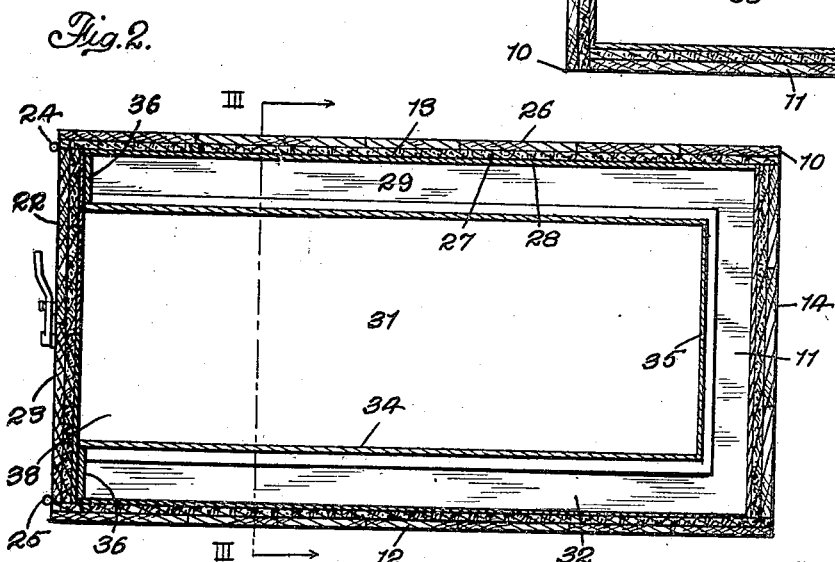
INVENTOR
Albert D. Sohmer
BY
N. T. Criswell
ATTORNEY Patented Nov. 21, 1922.

1,436,324

UNITED STATES PATENT OFFICE.

ALBERT D. SOHMER, OF NEW YORK, N. Y.

ICE BOX.

Application filed December 2, 1921. Serial No. 519,470.

*To all whom it may concern:*

Be it known that I, ALBERT D. SOHMER, a citizen of the Republic of France, and a resident of New York, in the county of New York and State of New York, have invented certain new and useful Improvements in an Ice Box, of which the following is a full, clear, and exact specification.

This invention relates to a class of refrigerating devices.

My invention has for its object primarily to provide an ice box designed to be employed for permitting perishable articles, such as meat, fish and other food products, to be conveyed to different localities in a clean, wholesome condition especially during warm weather, and which is of a form adapted for use in autotrucks and other vehicles whereby the contents may be kept under refrigerating temperature in a manner so as to be readily accessible for distribution. The invention consists mainly of a casing having on its interior an upper chamber of substantially the shape of an inverted U for holding ice, and under the upper chamber is a lower chamber with an alcove disposed within the U-shaped chamber for accommodating and keeping under refrigerating temperature especially food products, such as meat, fish and the like which are liable to spoilage when subjected to ordinary degrees of temperature. In the top of the casing may be one or more door closed entrances to allow ice to be packed in the upper chamber, and in one end of the casing may also be a door closed entrance for admitting and removal of articles into and from the lower chamber.

A further object of the invention is to provide an ice box of a simple, efficient and durable construction which may be made in any appropriate size and shape.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is a perspective view of one form of ice box embodying my invention.

Fig. 2 is a longitudinal section taken through the box on the line II—II of Fig. 3, and Fig. 3 is a transverse section taken through the box on the line III—III of Fig. 2.

The ice box has a casing 10 which may be substantially rectangular in shape to provide a bottom 11, side walls 12, 13 and an end wall 14. In the top of the casing is an entrance or inlet 15 which is opened and closed by one or two doors or lids, as 16 and 17. These doors are adapted to be swung upwardly and downwardly into and out the entrance by hinging the doors, at 18, 18$^a$ and 19, 19$^a$ to a strip or bar 20 extending across the central parts of the upper edges of the side walls 12 and 13 of the casing. In the end of the casing opposite the wall 14 is another entrance or inlet 21 which is opened and closed preferably by two doors, as 22 and 23, and the opposite ends of these doors are hinged, at 24 and 25, respectively, to the side walls 12 and 13 of the casing to allow of being swung in opposite directions into and out of the entrance 21. All of the walls and all of the doors of the casing 10 are watertight and airtight by constructing the casing of an outer shell or layer, as 26, of wood. Within this outer shell is a lining, as 27, preferably of metal, and between the metal lining and wood shell is an interlining of cork, as 28.

Within the casing 10 extending crosswise and lengthwise of its interior is an upper chamber 29 into which the entrance 15 leads, and this chamber is substantially the shape of an inverted U. In the lower part of the casing also extending crosswise and lengthwise is a lower chamber 30 with a communicating alcove 31 disposed within the upper chamber, and admission and exit is obtained into the lower chamber and into the alcove through the entrance 21. The chambers 29, 30 and alcove 31 are provided by forming within the casing 10 a partition, as 32, disposed on a longitudinal plane between the central parts of the ends and side walls of the casing, and the central part of this partition is cut-out, as at 33, lengthwise from its end at the entrance 21 toward the end wall 14 of the casing. The partition 32 is therefore substantially U-shaped, and protruding upward from the inner marginal edge of the partition is a wall 34 of somewhat an arch shape or approximately the shape of an inverted U, and one end of this U-shaped wall is closed by a wall 35, while on the other end of the wall is a wall, as 36, which extends from the side wall 34 to the side walls 12, 13 and to the top of the casing 10. The side wall 34 and its end wall 35 are of sizes so that they are spaced from the top and side walls of the casing to provide the chambers 29, 30 and the alcove 31. In practice I preferably employ the ice box in an auto truck or other vehicle by arranging the box in the body of the vehicle so that the doors 22 and 23 of the entrance 21 may be swung to open and closed positions at the tail end of the vehicle body and so that the doors or lids 16 and 17 of the casing may be swung upwardly and downwardly. Perishable products, such as meat, fish and the like are packed in the chamber 30 and in the alcove 31 through the entrance 21 of the casing 10, and the upper chamber 29 is packed with ice broken into small pieces with salt mixed therewith for reducing the temperature in the box to a degree whereby the contents of the lower chamber and alcove will be kept under proper refrigeration. The water collected in the chamber 29 from melted ice may be drained by providing an outlet, not shown, in a suitable part of this chamber.

In the foregoing description, I have embodied the preferred form of my invention, but I do not wish to be understood as limiting myself thereto, as I am aware that modifications may be made therein, without departing from the principle or sacrificing any of the advantages of this invention, therefore, I reserve to myself the right to make such changes as fairly fall within the scope thereof.

Having thus described my invention, I claim as new and desire to secure by Letters Patent:—

1. An ice box, comprising a casing having on its interior an upper chamber of substantially the shape of an inverted U for holding ice and also having a lower chamber with an upper alcove disposed within the U-shaped chamber.

2. An ice box, comprising a casing with a crosswise partition of substantially the shape of an inverted U dividing its interior into an upper chamber for holding ice and into a lower chamber for receiving articles, the upper chamber having a door closed inlet leading into its top.

3. An ice box, comprising a substantially rectangular casing with a crosswise partition of substantially the shape of an inverted U dividing its interior into an upper chamber for holding ice and into a lower chamber for receiving articles, the upper chamber having a door closed entrance leading into its top and the lower chamber having a door closed entrance leading into one of its ends.

4. An ice box, comprising a substantially rectangular casing, a crosswise partition on the interior of the casing, disposed on a longitudinal plane between the central parts of the side walls and end walls of the casing, said partition having its central portion cut-out lengthwise from one of its ends to form the partition of substantially a U-shape, and a wall of substantially the shape of an inverted U extending upwardly from the inner marginal edge of the longitudinal partition, said wall being spaced from the side walls and from the top of the casing.

5. An ice box, comprising a substantially rectangular airtight and waterproof casing, a crosswise partition on the interior of the casing, disposed on a longitudinal plane between the central parts of the side walls and end walls of the casing, said partition having its central portion cut-out lengthwise from one of its ends to form the partition of substantially a U-shape, a wall of substantially the shape of an inverted U extending upwardly from the inner marginal edge of the longitudinal partition, said wall being spaced from the side walls and from the top of the casing, and door closed entrances leading into the spaces above and under the partition and said wall.

This specification signed and witnessed this 1st day of December, A. D. 1921.

ALBERT D. SOHMER.

Witnesses:
A. LEICHTER,
FREDERICK CRYER.